United States Patent
Faccin et al.

(10) Patent No.: US 9,344,890 B2
(45) Date of Patent: May 17, 2016

(54) TRUSTED WIRELESS LOCAL AREA NETWORK (WLAN) ACCESS SCENARIOS

(71) Applicant: QUALCOMM Incorporated, San Diego, CA (US)

(72) Inventors: Stefano Faccin, Hayward, CA (US); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 14/328,518

(22) Filed: Jul. 10, 2014

(65) Prior Publication Data

US 2015/0020168 A1     Jan. 15, 2015

Related U.S. Application Data

(60) Provisional application No. 61/845,876, filed on Jul. 12, 2013.

(51) Int. Cl.
*H04L 29/06*     (2006.01)
*H04W 12/06*     (2009.01)
*H04W 84/12*     (2009.01)
*H04W 76/02*     (2009.01)

(52) U.S. Cl.
CPC ............... *H04W 12/06* (2013.01); *H04L 63/08* (2013.01); *H04W 84/12* (2013.01); *H04W 76/022* (2013.01); *H04W 76/025* (2013.01)

(58) Field of Classification Search
CPC ....................................................... H04L 63/08
USPC ............................................................. 726/4
See application file for complete search history.

(56) References Cited

U.S. PATENT DOCUMENTS

2014/0036807 A1*   2/2014   Huang et al. ................... 370/329
2014/0185603 A1*   7/2014   Kaippallimalil et al. ..... 370/338

FOREIGN PATENT DOCUMENTS

WO     WO-2014047545 A2     3/2014

OTHER PUBLICATIONS

"3rd Generation Partnership Project; Technical Specification Group Services and System Aspects; Study on S2a Mobility based on GTP & WLAN access to EPC (SaMOG); Stage 2 (Release 12)", 3GPP Draft; 23852-160_RM, 3rd Generation Partnership Project (3GPP), Mobile Competence Centre; 650, Route Des Lucioles; F-06921 Sophia-Antipolis Cedex; France, Jun. 5, 2013, XP050707971, pp. 1-163 Retrieved from the Internet:URL:http://www.3gpp.org/ftp/tsg_sa/WG2_Arch/Latest_SA2_Specs/Latest_draft_S2_Specs/ [retrieved on Jun. 5, 2013].

(Continued)

*Primary Examiner* — Longbit Chai
(74) *Attorney, Agent, or Firm* — Patterson & Sheridan, LLP

(57) ABSTRACT

A method to support two scenarios in trusted wireless local area network (WLAN) access is provided herein. The method may be performed, for example, by a user equipment (UE). The method generally includes requesting a nonseamless wireless offload (NSWO) connection to a network during an extensible authentication protocol (EAP) procedure and receiving, after successful authentication, at least one of an internet protocol (IP) address or a reason code from a network entity indicating NSWO is not allowed.

30 Claims, 6 Drawing Sheets

(56) References Cited

OTHER PUBLICATIONS

Alcatel et al., "Indications for EPC Access and NSWO", 3GPP Draft; C1-130114, 3rd Generation Partnership Project (3GPP), Mobile Competence Centre; 650, Route Des Lucioles; F-06921 Sophia-Antipolis Cedex; France, vol. CT WG1, No. San Jose del Cabo, Mexico; Jan. 28, 2013-Feb. 1, 2013, Jan. 20, 2013, XP050655729, pp. 1-7, Retrieved from the Internet: URL:http://www.3gpp.org/ftp/tsg_ct/WG1_mm_cc-sm_ex-CN1/TSGC1_82_SanJoseDelCabo/docs/ [retrieved on Jan. 20, 2013].

Cisco et al., "Two scenario approach using DHCPv4 and Stateless DHCPv6 as control-plane and a TWAG VMAC user-plane", 3GPP Draft; S2-131316_WAS_S2-130870 V2, 3rd Generation Partnership Project (3GPP), Mobile Competence Centre; 650, Route Des Lucioles; F-06921 Sophia-Antipolis Cedex; France, vol. SA WG2, No. San Diego, Californa,USA; Apr. 8, 2013-Apr. 12, 2013, Apr. 13, 2013, XP050708570, pp. 1-12, Retrieved from the Internet:URL:http://www.3gpp.org/ftp/tsg_sa/WG2_Arch/TSGS2_96_San_Diego/Docs/ [retrieved on Apr. 13, 2013].
International Search Report and Written Opinion—PCT/US2014/046332—ISA/EPO—Oct. 21, 2014.

\* cited by examiner

TRUSTED WIRELESS LOCAL AREA NETWORK (WLAN) ACCESS SCENARIOS

CROSS-REFERENCE TO RELATED APPLICATION(S)

This application claims benefit of U.S. Provisional Patent Application Ser. No. 61/845,876, filed Jul. 12, 2013, which is herein incorporated by reference in its entirety.

BACKGROUND

I. Field of the Disclosure

The present disclosure relates generally to communication systems, and more particularly, to a method to support two scenarios in trusted wireless local area network (WLAN) access.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

SUMMARY

Techniques and apparatus are provided herein for support of two scenarios (e.g., a scenario where a network supports nonseamless wireless offload (NSWO) and a scenario where the network does not support NSWO) in trusted wireless local area network (WLAN) access.

Certain aspects of the present disclosure provide a method for wireless communications by a user equipment (UE). The method generally includes requesting a NSWO connection to a network during an extensible authentication protocol (EAP) procedure and receiving, after successful authentication, at least one of an internet protocol (IP) address or a reason code from a network entity indicating NSWO is not allowed.

Certain aspects of the present disclosure provide a method for wireless communications. The method generally includes receiving a request from a UE for a NSWO connection to a network during an EAP procedure, determining whether or not the network supports NSWO, and after successful authentication, sending a reason code to the UE indicating NSWO is not allowed based on the determination.

Certain aspects of the present disclosure provide an apparatus for wireless communications by a UE. The apparatus generally includes means for requesting a NSWO connection to a network during an EAP procedure and means for receiving, after successful authentication, at least one of an IP address or a reason code from a network entity indicating NSWO is not allowed.

Certain aspects of the present disclosure provide an apparatus for wireless communications. The apparatus generally includes means for receiving a request from a UE for a NSWO connection to a network during an EAP procedure, means for determining whether or not the network supports NSWO, and means for, after successful authentication, sending a reason code to the UE indicating NSWO is not allowed based on the determination.

Certain aspects of the present disclosure provide an apparatus for wireless communications by a UE. The apparatus generally includes at least one processor configured to: request a NSWO connection to a network during an EAP procedure and receive, after successful authentication, at least one of an IP address or a reason code from a network entity indicating NSWO is not allowed. The apparatus generally also includes a memory coupled with the at least one processor.

Certain aspects of the present disclosure provide an apparatus for wireless communications. The apparatus generally includes at least one processor configured to: receive a request from a UE for a NSWO connection to a network during an EAP procedure, determine whether or not the network supports NSWO, and after successful authentication, send a reason code to the UE indicating NSWO is not allowed based on the determination.

Certain aspects of the present disclosure provide a computer readable medium for wireless communications by a UE. The computer readable medium generally has instructions stored thereon, the instructions executable by one or more processors, for: requesting a NSWO connection to a network during an EAP procedure and receiving, after successful authentication, at least one of an IP address or a reason code from a network entity indicating NSWO is not allowed.

Certain aspects of the present disclosure provide a computer readable medium for wireless communications. The computer readable medium generally has instructions stored thereon, the instructions executable by one or more processors, for: receiving a request from a UE for a NSWO connection to a network during an EAP procedure, determining whether or not the network supports NSWO, and after successful authentication, sending a reason code to the UE indicating NSWO is not allowed based on the determination.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
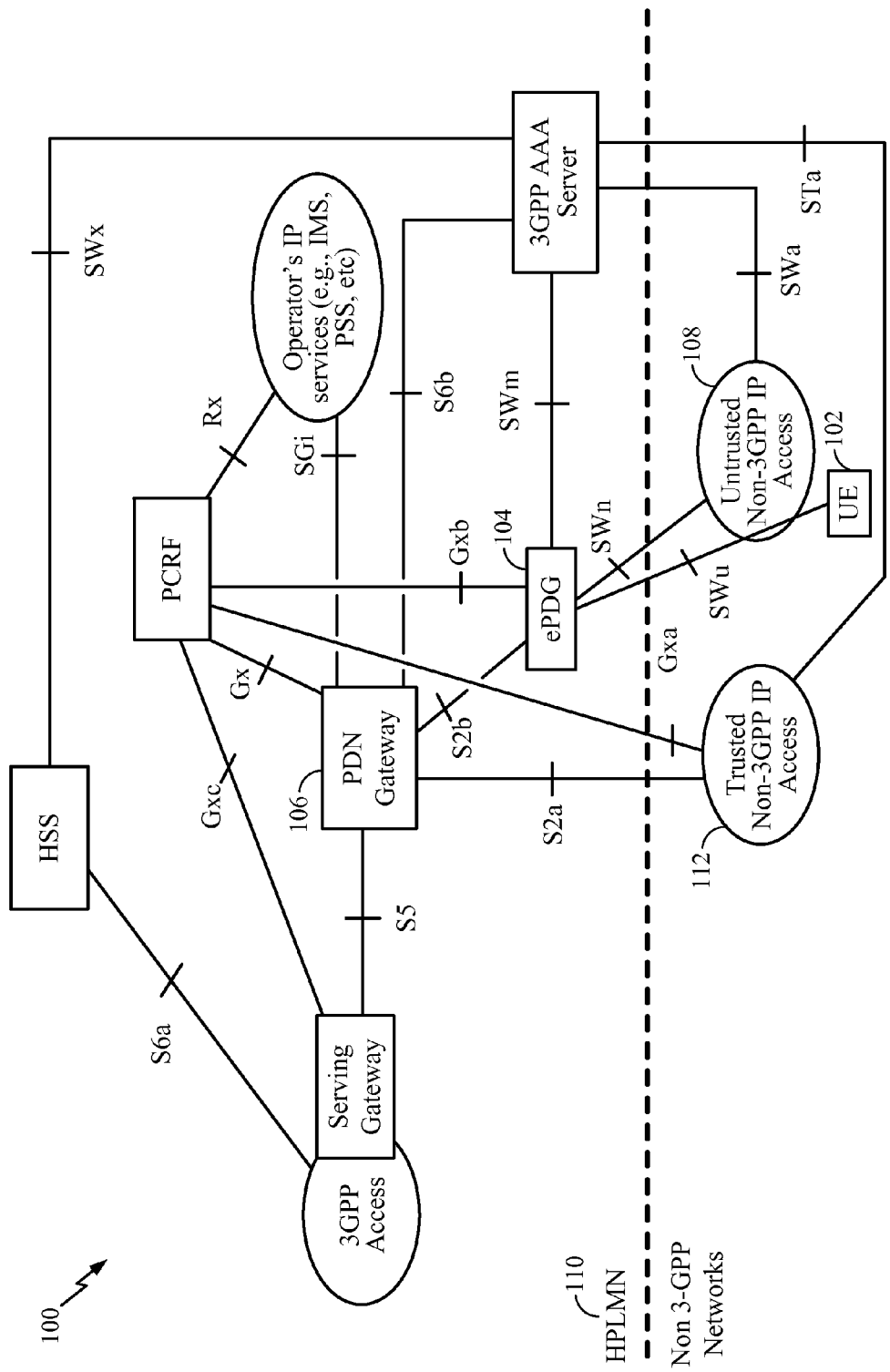
FIG. 1 is a diagram illustrating an example network architecture for support of mobility between a cellular link and a wireless local area network (WLAN), in accordance with certain aspects of the present disclosure.

Techniques and apparatus are provided herein for supporting scenarios in trusted wireless local area network (WLAN) access. For example, in a first scenario the WLAN may allow nonseamless wireless offload (NSWO) and in a second scenario the WLAN may not allow NSWO. A user equipment (UE) and the WLAN may each support only single connection or may support multiple connections. In the various scenarios the WLAN may know the UE type based on whether the UE requests a packet data network (PDN) connection or a NSWO connection during an extensible authentication protocol (EAP) authentication procedure. The WLAN may send reason codes to the UE, whereby the UE may know the network type based on the reason codes. The UE may, for example, disconnect or reauthenticate requesting a PDN connection based on the known network type.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Example Wireless Communications System

FIG. 1 is a diagram illustrating an example network architecture 100 for the support of mobility between a cellular link and a wireless local area network (WLAN), in accordance with certain aspects of the present disclosure. 3GPP has defined two mechanisms providing this support. In a first solution, referred to as the "S2b solution", a user equipment (UE) 102 establishes packet data network (PDN) connections over WLAN to an evolved packet core (EPC) network (e.g., home public land mobile network (HPLMN) 110). Since the WLAN 108 is untrusted, an enhanced packet data gateway (ePDG) 104 mediates communication between the UE 102 and the PDN gateway 106. As shown, the UE 102 tunnels its control and user plane data to the ePDG 104 by establishing Internet protocol security (IPSec) tunnels. In turn, the ePDG 104 establishes general packet radio service (GPRS) tunneling protocol (GTP) or proxy mobile Internet protocol (PMIP) tunnels to the appropriate PDN gateway (GW) 106.

In a second solution (not shown in FIG. 1), referred to as the "S2c solution", a UE (e.g., similar to UE 102) establishes connectivity by connecting to WLAN (either a trusted WLAN 112 not using IPSec tunnels, or an untrusted WLAN 108 using IPSec tunnels to an ePDG 104). The UE may then connect directly to the PDN GW 106, using DSMIPv6 for example.

In the S2b and S2c solutions, the UE 102 creates a new PDN connection over WLAN to a given access point name (APN) chosen by the UE 102. The UE 102 then transfers an existing PDN connection from cellular to WLAN by establishing connectivity over WLAN and indicating a handover for one or more PDN connections. The UE 102 can also connect to the same APN over cellular and WLAN simultaneously.

Figure 2:
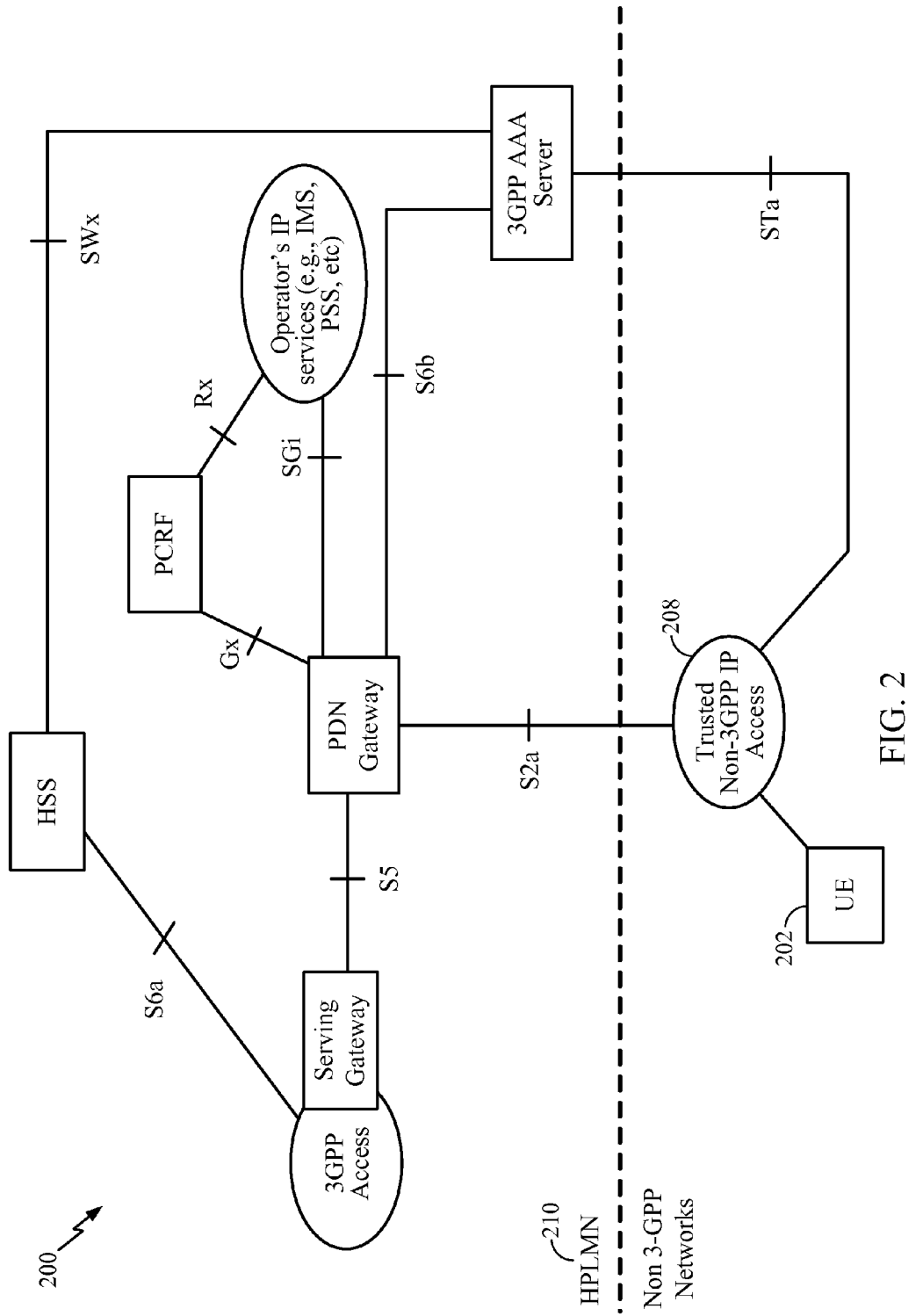
FIG. 2 is a diagram illustrating an example network architecture for the support of mobility between a cellular link and trusted WLAN, in accordance with certain aspects of the present disclosure.

FIG. 2 is a diagram illustrating an example network architecture 200 for the support of mobility between a cellular link and a trusted WLAN 208, in accordance with certain aspects of the present disclosure. In certain systems, connectivity over WLAN 208 to the EPC core network (e.g., HPLMN 210) using S2a may be enabled (e.g., a GTP or PMIP based solution). This may be referred to as the "S2a solution". In the S2a solution, WLANs which are considered trusted do not use establishment of IPSec tunnels or use an ePDG. Instead, connectivity is managed by the UE 202 selecting and connecting to trusted WLAN 208, and then exchanging signaling with trusted WLAN 208 access network in order to establish connectivity with the EPC (e.g. to establish PDN connections). This mechanism is referred to as "SaMOG" (S2a mobility over GTP).

Figure 3:
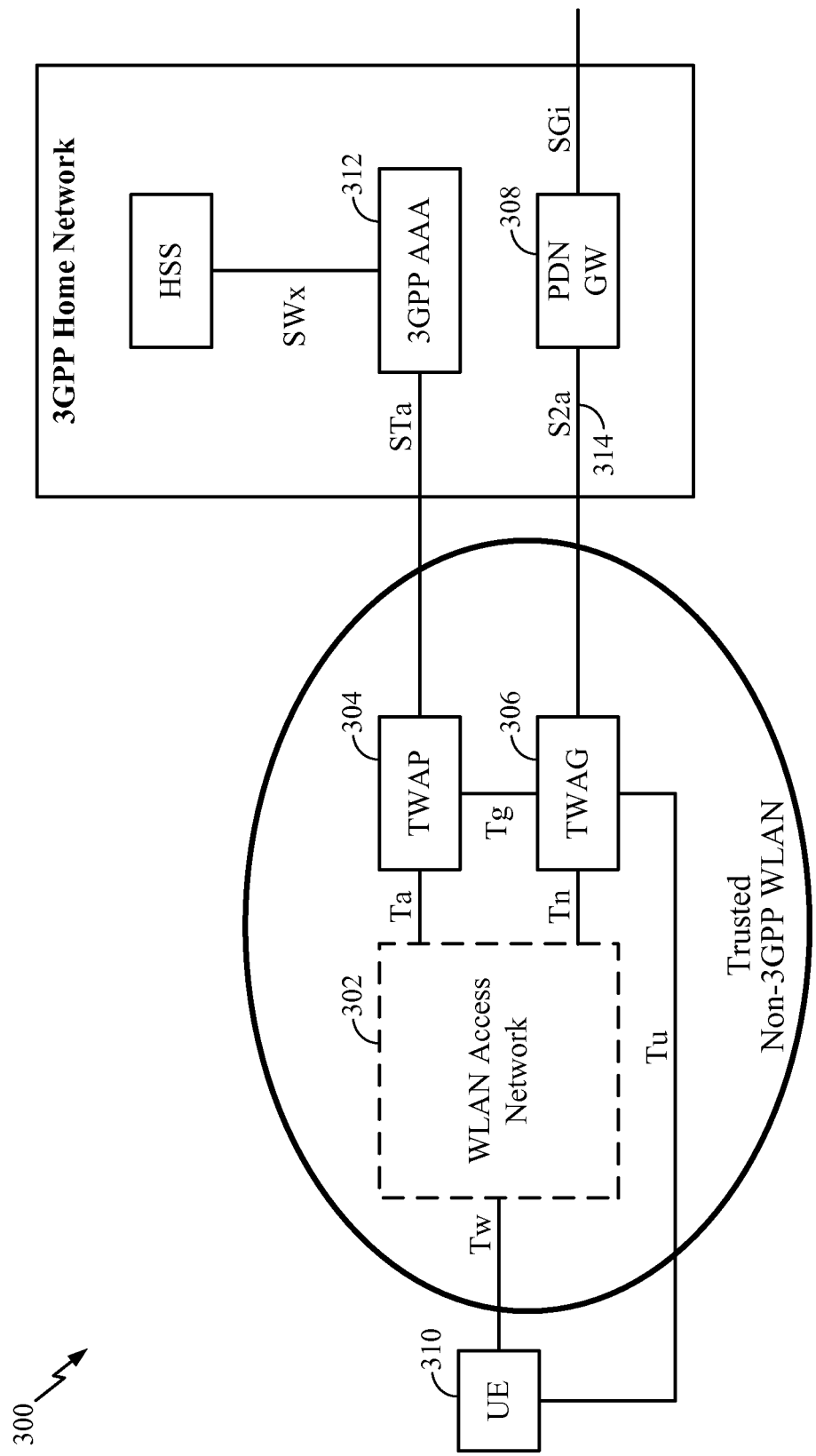
FIG. 3 is a diagram illustrating an example SaMOG architecture, in accordance with certain aspects of the present disclosure.

FIG. 3 is a diagram illustrating an example SaMOG architecture 300, in accordance with certain aspects of the present disclosure. The SaMOG architecture 300 includes a non-3GPP WLAN access network 302, a trusted WLAN authentication, authorization and accounting (AAA) proxy (TWAP) 304, and trusted WLAN access gateway (TWAG) 306 network elements that provide connectivity and control. The TWAG 306 is connected to a PDN gateway 308 over an S2a interface 314.

The TWAP 304 function relays the AAA information between the WLAN access network 302 and a 3GPP AAA server or proxy 312 in case of roaming. The TWAP 304 binds UE's 310 international mobile subscriber identity (IMSI) with the UE's 310 medium access control (MAC) address on the WLAN access network 302 forming a (IMSI, MAC) tuple. This can be accomplished via snooping on the AAA protocol carrying EAP-AKA exchange. For example, the TWAP 304 may detect a layer 2 (L2) attach of UE 310 to the WLAN access network 302 via snooping on the AAA protocol for an EAP-Success message, and inform the TWAG 306 of the WLAN attach and detach events for the UE 310 with the (MAC, IMSI) tuple.

The TWAG 306 function acts as a Default IPv4 Router, a Dynamic Host Configuration Protocol (DHCP) server, and/or a Default IPv6 Router. It enforces routing of packets between the UE MAC address and a GTP tunnel for that UE extending to the PDN gateway 308. The TWAG 306 function also enforces per-UE L2 encapsulation of traffic to/from the UE 310.

A UE 310 gains connectivity over the SaMOG architecture 300 by selecting a WLAN access network 302 with which to connect, authenticating with the selected WLAN access network 302, and exchanging control signaling with the TWAG 306 related to establishing connectivity. In response, if the TWAG 306 authorizes the connectivity, the TWAG 306 establishes the connectivity over the S2a interface to the correct PDN gateway 308.

A UE-TWAG protocol controls (e.g., setup and teardown) the per-PDN point-to-point link. This protocol is denoted as WLAN Control Protocol (WLCP). WLCP is a protocol defined by 3GPP and is transported above the layer 2. WLCP is not an IP protocol and it sits below the IP layer.

WLCP provides session management functionality for PDN connections. It provides establishment of PDN connections, handover of PDN connections, requests for release of a PDN connections by the UE 310, notification to the UE 310 of the release of a PDN connection, IP address assignment (both IPv4 and IPv6 address assignment mechanisms defined for NAS can be applied), and PDN parameters management including: APN, PDN type, address, Protocol Configuration Options (PCO), request type, L2 transport identifier.

WLCP applies to the support of multiple PDN connections and enables UE 310 to behave similar to behavior over a cellular link. WLCP is a protocol running between the UE 310 and the TWAG 306. Thus the intermediate nodes (e.g. access point (AP)) between the UE 310 and the TWAG 306 may not support or understand WLCP.

WLCP protocol can, for example, be transported with wireless MAC frames from the UE 310 to the access point, and from the access point to the TWAG 306. A point-to-point link between the UE 310 and TWAG 306 transports L2 packets or L2 packet data units (PDU) so the packets can be routed correctly to the TWAG 306 and so the TWAG 306 knows that the packets contain control signaling. When packets are routed from the TWAG 306 to the UE 310, the UE 310 knows it is control signaling.

Figure 4:
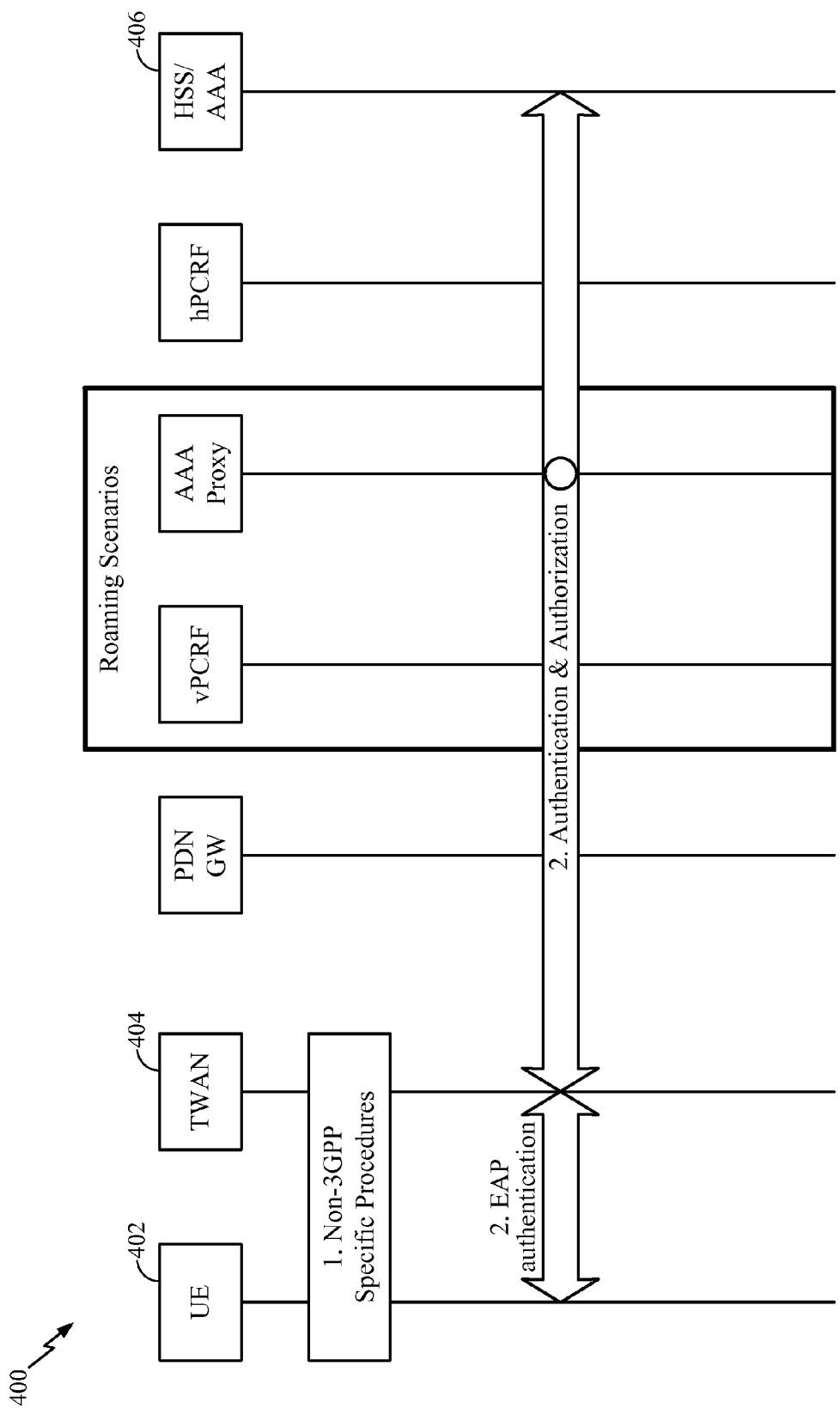
FIG. 4 is a diagram illustrating an example call flow of an initial attachment and device authentication in SaMOG, in accordance with certain aspects of the present disclosure.

FIG. 4 is a diagram illustrating a call flow 400 of an initial attachment and device authentication in SaMOG, in accordance with certain aspects of the present disclosure. At 1, both the UE 402, the trusted WLAN access network (TWAN) 404, and the 3GPP AAA server 406 in the home public land mobile network (HPLMN) discover whether all of them support fully fledged trusted WLAN access to the EPC (i.e., concurrent multiple PDN connections, IP address preservation, and concurrent NSWO and EPC access). For example, the UE 402 discovers the TWAN 404 and associates with it.

Then, at 2, the TWAN 404 begins the EAP exchange by sending an EAP request message as part of the authentication procedure. As part of the EAP exchange, the UE 402, the TWAN 404, and the 3GPP AAA server 406 in the HPLMN discover whether all of them do support fully fledged Trusted WLAN access to the EPC (i.e., concurrent multiple PDN connections, IP address preservation, and concurrent NSWO and EPC access). If the UE 402, the TWAN 404, and the 3GPP AAA server 406 in the HPMLN do not support fully fledged trusted WLAN access to the EPC, neither PDN connections nor NSWO are offered automatically by the trusted WLAN without an explicit request from the UE 402.

Trusted Wireless Local Area Network (WLAN) Access Scenarios

The number of wireless subscribers accessing mobile data services continues to increase. Developments will continue to drive the increase of mobile data traffic volume. However, they could also create challenges for operators in supporting traffic growth. Since wireless local area network (WLAN) is widely available at home and various hotspots, and is also in a number of wireless devices, a mechanism that offloads data traffic to Wi-Fi is very compelling to operators that want to minimize data costs and make better use of their assets. Seamless Offload enables seamless handover of data traffic to Wi-Fi. The basic idea is whenever a WLAN access point is available, some or all of the traffic is routed through the WLAN access point, thus offloading the cellular access. Non-seamless WLAN offload is an optional capability that applies to a user equipment (UE) that can support WLAN radio access in addition to 3G radio access. It allows a UE to be directed to shift traffic from the 3G based Radio Access Network (RAN) to a Wi-Fi connection. To perform the non-seamless WLAN offload, the UE acquires a local IP address through the WLAN access network. The UE does is not required to connect to an evolved packet data gateway (ePDG). However, whereas for seamless offload IP address is maintained, for NSWO the IP address is not maintained.

As described above, procedures may be defined for devices (e.g., user equipments (UEs)) to access an evolved packet core (EPC) core network through trusted wireless local area network (WLAN) access. Certain systems (e.g., Release 11 SaMOG) support a single multiple packet data network (PDN) connection without internet protocol (IP) preservation. However, it may desirable to support multiple PDN connections, IP address preservation, and concurrent PDN connections with nonseamless wireless offload (NSWO). A system (e.g., pre-Rel-12) which supports single PDN connection with IP address preservation may be desirable. It may also be desirable for the solution to be backward compatible (e.g., with pre-Rel-12).

Techniques and apparatus are provided herein for supporting various scenarios in trusted WLAN access. For example, in a first scenario the network (e.g., similar to WLAN access network 302) may allow NSWO and in a second scenario the network may not allow NSWO. A UE (e.g., similar to UE 310) and the network may each support only single connection or may support multiple connections. In the various scenarios the network may know the UE type based on whether the UE requests a PDN connection or a NSWO connection during an extensible authentication protocol (EAP) authentication procedure. The network may send reason codes to the UE and the UE may know the network type based on the reason codes. Based on the known network type, the UE may disconnect or reauthenticate requesting a PDN connection.

According to certain aspects, one benefit of the proposed solution is that it may not involve any extra capability negotiation between the UE and network through EAP authentication procedures. This may avoid interworking issues caused by different capabilities of the UE and the network. For example, the UE may be capable of single connection or multi-connection. Similarly, the network may also be capable of single connection or multi-connection.

According to certain aspects, EAP authentication may allow the UE (e.g., similar to UE 310) to request a PDN or NSWO connection to the network (e.g., the 3GPP Home Network of FIG. 3). According to certain aspects, a UE that supports multiple connections may be configured to request NSWO during EAP authentication procedures (i.e., a multiple connection UE may not request a PDN connection during EAP procedures). Therefore, by the UE requesting a PDN connection during an EAP authentication procedure, the network may implicitly know the UE's capability (e.g., whether the UE supports multiple connections or single connection only). For example, if the UE requests a PDN during the EAP authentication procedure, the network may know that the UE supports a single PDN connection.

According to certain aspects, in response to a UE request for a PDN connection, the network may return reason codes (e.g., "NSWO not allowed, PDN connection required" or "NSWO not allowed") to the UE—even if EAP authentication succeeds. Based on the reason codes, the UE may know the network's capability (e.g., whether the network supports single or multiple connections and whether the network supports or does not support NSWO). The UE may behave in different manners based on which reason code is received (i.e., based on whether the UE knows the network supports single or multiple connection or does or does not support NSWO).

According to certain aspects, the UE may support a single PDN connection or may support multiple PDN connections. According to certain aspects, the network also may support a single PDN connection or may support multiple PDN connections. According to certain aspects, the network may allow NSWO. Alternatively, the network may not allow NSWO. The UE and the network behavior may vary depending on the various scenarios involving different combinations of whether the UE or network support single or multiple connections and whether NSWO is allowed or not allowed by the network.

According to certain aspects, the network may not allow NSWO for the UE. In a first scenario where the network does not allow NSWO for the UE, the UE and the network may both support single PDN connection. The single-connection UE may request NSWO or PDN connection during an EAP authentication protocol. According to certain aspects, if the UE requests PDN, the authentication may succeed, and an IP address may be assigned to the UE, for example, from the packet gateway (P-GW). The network may know that the UE is a single-connection UE because the UE requested a PDN connection during authentication (i.e., as a multiple-connection UE may not do so). Alternatively, the UE may request NSWO during the EAP authentication procedure. The authentication may succeed; however, because NSWO is not allowed, an IP address may not be assigned to the UE. Instead, the network may send the UE a reason code specifying "NSWO not allowed, PDN connection required." In this case, if the UE wants a PDN connection, the UE may then attempt to reauthenticate and request a PDN connection. Otherwise, the UE may disconnect if the UE does not want a PDN connection.

In a second scenario where the network does not allow NSWO for the UE, the UE may support single connection only and the network may support multiple connections. If the single connection UE requests a PDN connection during the EAP authentication procedure, the authentication may succeed and an IP address may be assigned to the UE (e.g., by the PGW). The network may know that the UE is a single connection UE because the UE requested a PDN connection during authentication (i.e., as a multiple connection UE may not do so). Alternatively, the single-connection UE may request NSWO during the EAP authentication procedure. The authentication may succeed; however, because NSWO is not allowed, an IP address may not be assigned. The network may send the UE a reason code specifying "NSWO not allowed." In this case, the single-connection UE may attempt to reauthenticate and request a PDN connection during the EAP authentication procedure if the UE wants a PDN connection. Otherwise, the UE may disconnect. Thus, although the network sends different reason codes, a single-connection UE may behave the same after requesting NSWO when NSWO is not allowed, regardless whether the network is supports single connection only or multiple connections.

In a third scenario where the network does not allow NSWO for the UE, the UE may support multiple connections and the network may support single connection only. Unlike the scenarios for a single connection UE, the multiple-connection UE may only request NSWO during the EAP authentication procedure (i.e., the multiple-connection UE shall not request PDN during the EAP authentication procedure). After requesting NSWO the authentication may succeed; however, because NSWO is not allowed, an IP address may not be assigned. The network may send the UE the reason code specifying "NSWO not allowed, PDN connection required." In this case, the multiple-connection UE may behave similar to the single-connection UE in response to the reason code. The multiple-connection UE may attempt to reauthenticate and request PDN if the UE wants a PDN connection or the UE may disconnect if it does not want a PDN connection.

In a fourth scenario where the network does not allow NSWO for the UE, the UE and the network may both support multiple connections. The multiple-connection UE may only request NSWO during the EAP authentication procedure. The authentication may succeed; however, because NSWO is not allowed, an IP address may not be assigned. The network may send the reason code "NSWO not allowed" to the UE. In this case, the multiple-connection UE may remain authenticated and can request PDN connections using WLAN Control Protocol (WLCP).

According to certain aspects, the network may allow NSWO. In a first scenario where the network allows NSWO, the UE and the network may each support single connection only. If the single-connection UE requests a PDN connection during the EAP authentication procedure, the authentication may succeed with an IP address assigned (e.g., from the P-GW). Alternatively, if the UE requests NSWO during the EAP authentication procedure, the authentication may succeed and, because NSWO is allowed, a local IP address may be assigned.

In a second scenario where the network allows NSWO, the UE may support single connection only and the network may support multiple connections. If the single-connection UE requests a PDN connection to the network during the EAP authentication procedure, the authentication may succeed and an IP address may be assigned to the UE (e.g., from the P-GW). According to certain aspects, the network may implicitly know that the UE is a single-connection UE based on the connection type requested (i.e., because a multiple-connection UE shall not request PDN during the EAP authentication procedure). Alternatively, if the UE requests NSWO during the EAP authentication procedure, the authentication may succeed and, because NSWO is allowed, a local IP address may be assigned to the UE. Thus, when network allows NSWO, the single-connection UE may behave the same regardless whether the network is single-connection or multiple-connection.

In a third scenario where the network allows NSWO, the UE may support multiple connections while the network may support only single connection. The multiple-connections UE may only request NSWO during the EAP authentication procedure (i.e., the multiple-connection UE shall not request PDN during the EAP authentication procedure). The authentication may succeed and a local IP address may be assigned to the UE (e.g., from the P-GW). According to certain aspects, if the UE then requests PDN using WLCP, the request may fail. According to certain aspects, after a number of unsuccessful retries, the multiple-connections UE may determine that it is roaming to the single PDN network. According to certain aspects, the multiple-connections UE may be configured to attempt only a limited number of retries. For example, the retry strategy may be configured in the UE. If the multiple-connections UE wants PDN connectivity, the UE may reauthenticate requesting PDN.

In a fourth scenario where the network allows NSWO, the UE and the network may each support multiple connections. In this scenario, the UE may request NSWO. The authentication may succeed and, because NSWO is allowed, a local IP address may be assigned to the UE (e.g., by the P-GW). According to certain aspects, the UE may then request a PDN connection using WLCP.

Figure 5:
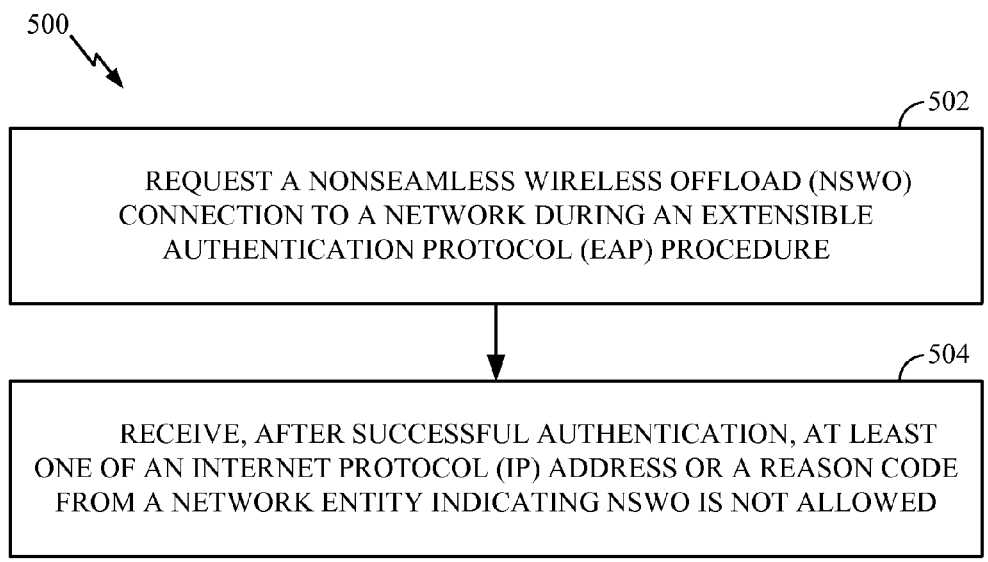
FIG. 5 is a block diagram illustrating example operations for wireless communications by a user equipment (UE), in accordance with certain aspects of the present disclosure.

FIG. 5 illustrates example operations 500 for wireless communications, in accordance with certain aspects of the present disclosure. The operations 500 may be performed, for example, by a UE (e.g., similar to UE 310). The operations 500 may begin, at 502, by requesting a NSWO connection to a network during an EAP procedure.

According to certain aspects, the UE may request a PDN connection to the network using WLCP while remaining authenticated if the UE and the network support multiple connections.

At 504, the UE may receive, after successful authentication, at least one of an internet protocol (IP) address or a reason code from a network entity indicating NSWO is not allowed.

For example, the UE may receive the reason code indicating the NSWO is not allowed if the network does not support NSWO. According to certain aspects, the reason code may further indicates that a PDN connection is required if the network supports only single-connection. According to certain aspects, the UE may disconnect if a PDN connection is not desired. According to certain aspects, the UE may request a PDN connection to the network during an EAP reauthentication procedure. The UE may receive, after successful reauthentication, an IP address assigned by the network (e.g., by the P-GW).

According to certain aspects, the UE may receive the IP address if the network supports NSWO. According to certain aspects, the UE may further request a PDN connection to the network using WLCP if the UE supports multiple connections and the network supports only single connection. According to certain aspects, the UE may determine that the UE is roaming to the single connection network if the request fails one or more times. According to certain aspects, the UE may then request a PDN connection to the network during an EAP reauthentication procedure if the UE desires a PDN connection.

Figure 6:
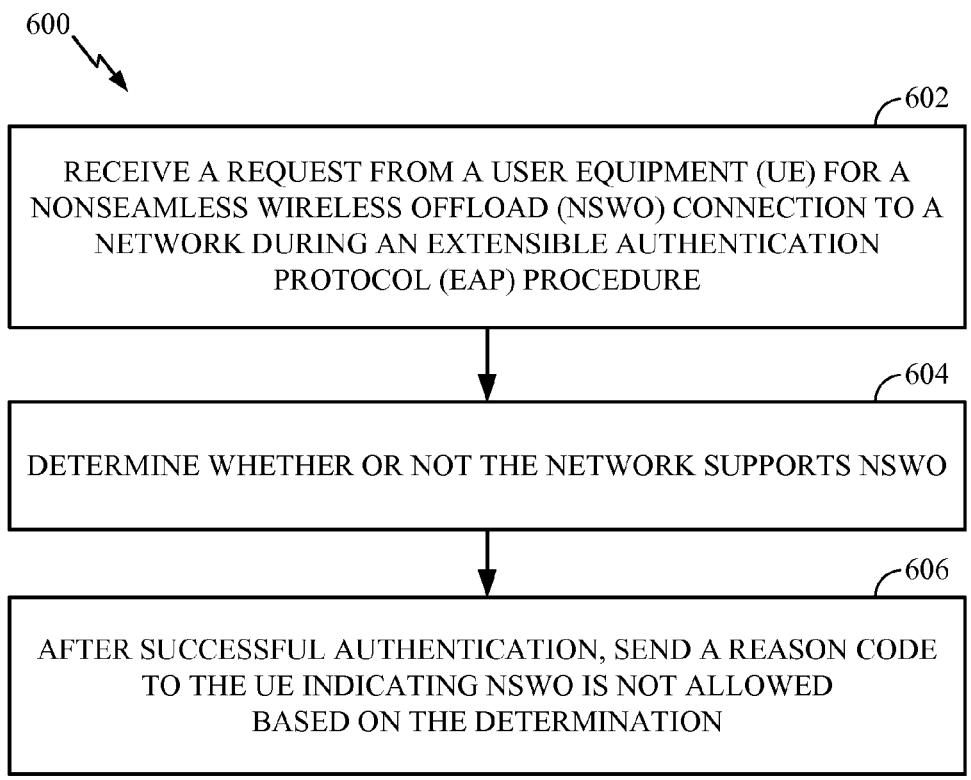
FIG. 6 is a block diagram illustrating example operations for wireless communications, in accordance with certain aspects of the present disclosure.

FIG. 6 illustrates example operations 600 for wireless communications, in accordance with certain aspects of the present disclosure. The operations 600 may be performed, for example, by a network entity (e.g., TWAG 306). The operations 600 may begin, at 602, by receiving a request from a UE for a NSWO connection to a network during an EAP procedure.

At 604, the network entity may determine whether or not the network supports NSWO.

At 606, after successful authentication, the network entity may send a reason code to the UE indicating NSWO is not allowed based on the determination. For example, the network entity may send a reason code indicating the NSWO is not allowed if the network does not support NSWO. According to certain aspects, the reason code may further indicate that a PDN connection is required if the network is a single-connection network.

According to certain aspects, the network entity may then receive a request from the UE for a PDN connection to the network during an EAP reauthentication procedure. The network entity may assign, after successful reauthentication, an IP address to the UE (e.g., by a P-GW).

According to certain aspects, the network entity may receive a request from the UE for a PDN connection to the network over WLCP while remaining authenticated if the UE and the network support multiple connections.

Figure 5A:
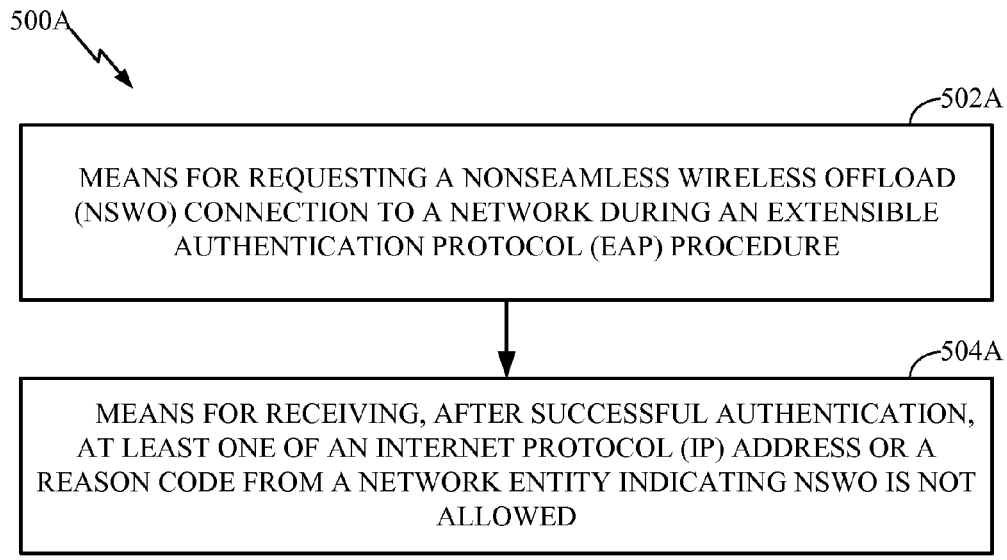
FIG. 5A illustrates example means capable of performing the operations shown in FIG. 5, in accordance with certain aspects of the present disclosure.
Figure 6A:
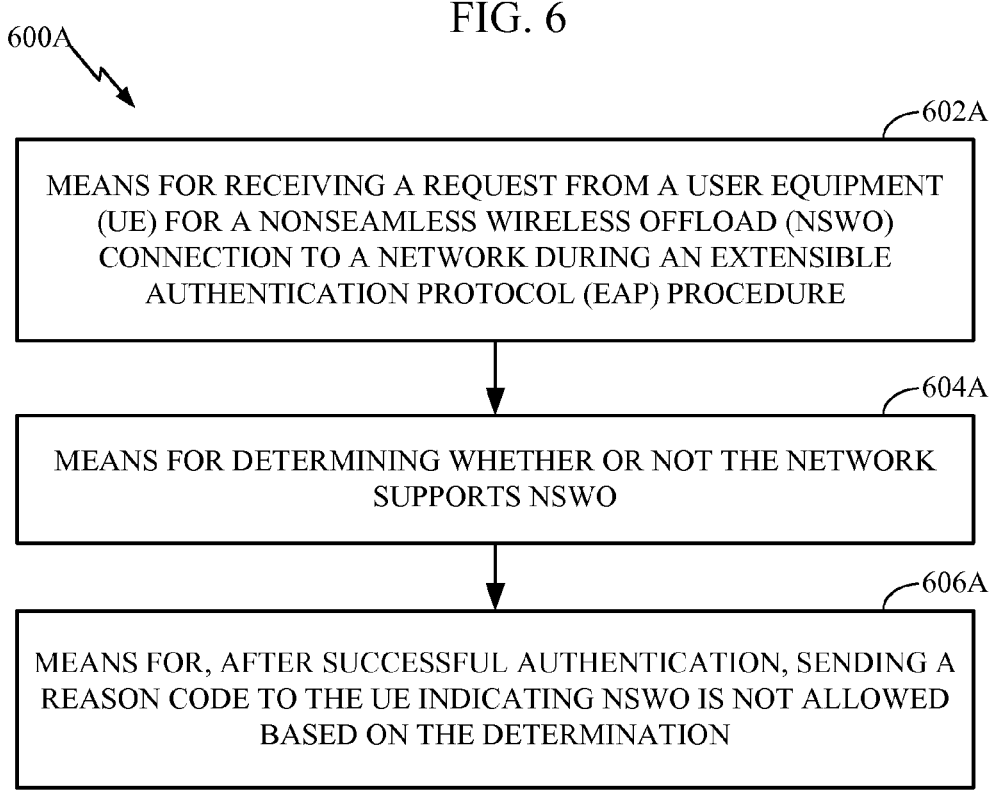
FIG. 6A illustrates example means capable of performing the operations shown in FIG. 6, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6, respectively, correspond to means 500A and 600A illustrated in FIGS. 5A and 6A, respectively.

For example, means for transmitting may comprise a transmitter and/or an antenna(s) of the UE (e.g., UE 310) or network entity (e.g., TWAG 306 or 3GPP AAA sever 312). Means for receiving may comprise a receiver and/or an antenna(s) of the UE (e.g., UE 310) or network entity (e.g., TWAG 306 or 3GPP AAA sever 312). Means for determining may comprise a processing system, which may include one or more processors, of the UE (e.g., UE 310) or network entity (e.g., TWAG 306 or 3GPP AAA sever 312).

According to certain aspects, such means may be implemented by processing systems configured to perform the corresponding functions by implementing various algorithms (e.g., in hardware or by executing software instructions). For example, an algorithm for requesting a nonseamless wireless offload (NSWO) connection to a network during an extensible authentication protocol (EAP) procedure and an algorithm for receiving, after successful authentication, at least one of an internet protocol (IP) address or a reason code from a network entity indicating NSWO is not all. Similarly, an algorithm for receiving a request from a user equipment (UE) for a nonseamless wireless offload (NSWO) connection to a network during an extensible authentication protocol (EAP) procedure, an algorithm for determining whether or not the network supports NSWO, and algorithm for after successful authentication, sending a reason code to the UE indicating NSWO is not allowed based on the determination.

The various algorithms may implemented by a computer-readable medium that may be a non-transitory computer-readable medium. The computer-readable medium may have computer executable instructions (e.g, code) stored thereon. For example, the instructions may be executed by a processor or processing system of the UE (e.g., UE 310) or network entity (e.g., TWAG 306 or 3GPP AAA sever 312) and stored in a memory of the UE (e.g., UE 310) or network entity (e.g., TWAG 306 or 3GPP AAA sever 312). For example, the computer-readable medium may have computer executable instructions stored thereon for requesting a nonseamless wireless offload (NSWO) connection to a network during an extensible authentication protocol (EAP) procedure and instructions for receiving, after successful authentication, at least one of an internet protocol (IP) address or a reason code from a network entity indicating NSWO is not all. Similarly, the computer-readable medium may have computer executable instructions stored thereon for receiving a request from a user equipment (UE) for a nonseamless wireless offload (NSWO) connection to a network during an extensible authentication protocol (EAP) procedure, instructions for determining whether or not the network supports NSWO, and instructions for after successful authentication, sending a reason code to the UE indicating NSWO is not allowed based on the determination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
   requesting, by the UE, a nonseamless wireless offload (NSWO) connection to a network entity during an extensible authentication protocol (EAP) procedure; and
   after successful authentication via the EAP procedure:

if NSWO connection to the network entity is supported, receiving by the UE, from the network entity, an internet protocol (IP) address; and if NSWO connection to the network entity is not supported, receiving by the UE, from the network entity, a reason code indicating that NSWO connection to the network entity is not allowed.

2. The method of claim 1, wherein the reason code further indicates that a packet data network (PDN) connection is required if single-connection only to the network entity is supported.

3. The method of claim 1, further comprising disconnecting if a packet data network (PDN) connection is not desired.

4. The method of claim 1, further comprising:
   requesting a packet data network (PDN) connection to the network entity during an EAP reauthentication procedure; and
   receiving, after successful reauthentication, an IP address assigned by the network entity.

5. The method of claim 4, wherein the network entity comprises a packet gateway (P-GW).

6. The method of claim 1, further comprising:
   requesting a packet data network (PDN) connection to the network entity using wireless local area network (WLAN) control protocol (WLCP) while remaining authenticated if the UE and the network entity support multiple connections.

7. The method of claim 1, further comprising:
   requesting a packet data network (PDN) connection to the network entity using wireless local area network (WLAN) control protocol (WLCP) if the UE supports multiple connections and the network entity supports only single connection; and
   determining the UE is roaming to the single connection network if the request fails one or more times.

8. The method of claim 7, further comprising:
   requesting a PDN connection to the network entity during an EAP reauthentication procedure if the UE desires a PDN connection.

9. A method for wireless communications, comprising:
   receiving, at a network entity, a request from a user equipment (UE) for a nonseamless wireless offload (NSWO) connection to the network entity during an extensible authentication protocol (EAP) procedure;
   determining, at the network entity, whether or not NSWO connection to the network entity is supported; and
   after successful authentication via the EAP procedure:
   if NSWO connection to the network entity is not supported, sending, by the network entity, a reason code to the UE indicating that NSWO connection to the network entity is not allowed.

10. The method of claim 9, wherein the reason code further indicates that a packet data network (PDN) connection is required if a single-connection only to the network entity is supported.

11. The method of claim 9, further comprising:
   receiving a request from the UE for a packet data network (PDN) connection to the network entity during an EAP reauthentication procedure; and
   assigning, after successful reauthentication, an IP address to the UE.

12. The method of claim 11, wherein the network entity comprises a packet gateway (P-GW).

13. The method of claim 9, further comprising:
   receiving a request from the UE for a packet data network (PDN) connection to the network entity over wireless local area network (WLAN) control protocol (WLCP) while remaining authenticated if the UE and the network entity support multiple connections.

14. An apparatus for wireless communications by a user equipment (UE), comprising:
   means for requesting a nonseamless wireless offload (NSWO) connection to a network entity during an extensible authentication protocol (EAP) procedure; and
   means for receiving from the network entity, after successful authentication via the EAP procedure:
   an internet protocol (IP) address if NSWO connection to the network entity is supported; and
   a reason code indicating that NSWO connection to the network entity is not allowed if NSWO connection to the network entity is not supported.

15. The apparatus of claim 14, wherein the reason code further indicates that a packet data network (PDN) connection is required if only single-connection to the network entity is supported.

16. The apparatus of claim 14, further comprising means for disconnecting if a packet data network (PDN) connection is not desired.

17. The apparatus of claim 14, further comprising:
   means for requesting a packet data network (PDN) connection to the network entity during an EAP reauthentication procedure; and
   means for receiving, after successful reauthentication, an IP address assigned by the network entity.

18. The apparatus of claim 17, wherein the network entity comprises a packet gateway (P-GW).

19. The apparatus of claim 14, further comprising:
   means for requesting a packet data network (PDN) connection to the network entity using wireless local area network (WLAN) control protocol (WLCP) while remaining authenticated if the UE and the network entity support multiple connections.

20. The apparatus of claim 14, further comprising:
   means for requesting a packet data network (PDN) connection to the network entity using wireless local area network (WLAN) control protocol (WLCP) if the UE supports multiple connections and the network entity supports only single connection; and
   means for determining the UE is roaming to the single connection network if the request fails one or more times.

21. The apparatus of claim 20, further comprising:
   means for requesting a PDN connection to the network entity during an EAP reauthentication procedure if the UE desires a PDN connection.

22. An apparatus for wireless communications, comprising:
   means for receiving a request from a user equipment (UE) for a nonseamless wireless offload (NSWO) connection to a network entity during an extensible authentication protocol (EAP) procedure;
   means for determining whether or not NSWO connection to the network entity is supported; and
   means for sending, after successful authentication via the EAP procedure, a reason code to the UE indicating that NSWO connection to the network entity is not allowed if NSWO connection to the network entity is not supported.

23. The apparatus of claim 22, wherein the reason code further indicates that a packet data network (PDN) connection is required if a single-connection only to the network entity is supported.

24. The apparatus of claim 22, further comprising:
means for receiving a request from the UE for a packet data network (PDN) connection to the network entity during an EAP reauthentication procedure; and
means for assigning, after successful reauthentication, an IP address to the UE.

25. The apparatus of claim 24, wherein the network entity comprises a packet gateway (P-GW).

26. The apparatus of claim 22, further comprising:
means for receiving a request from the UE for a packet data network (PDN) connection to the network entity over wireless local area network (WLAN) control protocol (WLCP) while remaining authenticated if the UE and the network entity support multiple connections.

27. An apparatus for wireless communications by a user equipment (UE), comprising:
at least one hardware processor configured to:
request a nonseamless wireless offload (NSWO) connection to a network entity during an extensible authentication protocol (EAP) procedure; and
after successful authentication via the EAP procedure:
if NSWO connection to the network entity is supported, receive from the network entity, an internet protocol (IP) address; and
if NSWO connection to the network entity is not supported, receive from the network entity, a reason code indicating that NSWO connection to the network entity is not allowed; and
a memory coupled with the at least one processor.

28. An apparatus for wireless communications, comprising:
at least one hardware processor configured to:
receive a request from a user equipment (UE) for a nonseamless wireless offload (NSWO) connection to a network entity during an extensible authentication protocol (EAP) procedure;
determine whether or not NSWO connection to the network entity is supported; and
after successful authentication via the EAP procedure:
if NSWO connection to the network entity is not supported, send a reason code to the UE indicating that NSWO connection to the network entity is not allowed; and
a memory coupled with the at least one processor.

29. A non-transitory computer readable medium having instructions stored thereon, the instructions executable by one or more processors, for:
requesting, by a user equipment (UE), a nonseamless wireless offload (NSWO) connection to a network entity during an extensible authentication protocol (EAP) procedure; and
after successful authentication via the EAP procedure:
if NSWO connection to the network entity is supported, receiving by the UE, from the network entity, an internet protocol (IP) address; and
if NSWO connection to the network entity is not supported, receiving by the UE, from the network entity, a reason code indicating that NSWO connection to the network entity is not allowed.

30. A non-transitory computer readable medium for wireless communications comprising a computer readable medium having instructions stored thereon, the instructions executable by one or more processors, for:
receiving a request from a user equipment (UE) for a nonseamless wireless offload (NSWO) connection to a network entity during an extensible authentication protocol (EAP) procedure;
determining whether or not NSWO connection to the network entity is supported; and
after successful authentication via the EAP procedure:
if NSWO connection to the network entity is not supported, sending a reason code to the UE indicating that NSWO connection to the network entity is not allowed.

\* \* \* \* \*